United States Patent
Helm et al.

(10) Patent No.: US 10,253,989 B2
(45) Date of Patent: Apr. 9, 2019

(54) METHOD FOR OPERATING A COOKING DEVICE, AND SUCH A COOKING DEVICE FOR PERFORMING THE METHOD

(71) Applicant: MKN Maschinenfabrik Kurt Neubauer GmbH & Co. KG, Wolfenbuettel (DE)

(72) Inventors: Peter Helm, Wolfenbuettel (DE); Henrik Puls, Hamburg (DE); Ralph Depke, Wunstorf (DE)

(73) Assignee: MKN Maschinenfabrik Kurt Neubauer GmbH & Co. KG (DE)

( * ) Notice: Subject to any disclaimer, the term of this patent is extended or adjusted under 35 U.S.C. 154(b) by 339 days.

(21) Appl. No.: 15/029,178

(22) PCT Filed: Oct. 14, 2014

(86) PCT No.: PCT/EP2014/072051
§ 371 (c)(1),
(2) Date: Apr. 13, 2016

(87) PCT Pub. No.: WO2015/055676
PCT Pub. Date: Apr. 23, 2015

(65) Prior Publication Data
US 2016/0258634 A1    Sep. 8, 2016

(30) Foreign Application Priority Data

Oct. 14, 2013    (EP) ..................................... 13188602
Jan. 27, 2014    (EP) ..................................... 14152704

(51) Int. Cl.
H05B 1/02    (2006.01)
F24C 7/08    (2006.01)
(Continued)

(52) U.S. Cl.
CPC .............. *F24C 15/327* (2013.01); *A21B 1/26* (2013.01); *F24C 7/006* (2013.01); *F24C 7/085* (2013.01);
(Continued)

(58) Field of Classification Search
None
See application file for complete search history.

(56) References Cited

U.S. PATENT DOCUMENTS 5,528,018 A * 6/1996 Burkett .................. F24C 7/087
219/413

FOREIGN PATENT DOCUMENTS

DE    102008016824    10/2009
DE    102006035745    3/2010
(Continued)

OTHER PUBLICATIONS

EP2256415A2, Dec. 2010, Erdmann et al, partial translation.*

*Primary Examiner* — Joseph M Pelham
(74) *Attorney, Agent, or Firm* — Jansson Munger McKinley & Kirby Ltd.

(57) ABSTRACT

An apparatus and related method for operating a cooking appliance comprising a convection oven, a hot-air steamer, or a convection steamer, which includes a cooking chamber which can be closed by a door, a heating device, at least one steam injection device, at least one flow-generating device such as a blower, at least one temperature sensor, which detects the temperature in the cooking chamber, and an electronic appliance control unit with memory, in which cooking programs comprising the cooking sequences for specific food products are stored. Based on the time extending from a starting to a target temperature value, it is determined on the basis of the detected temperature curve in the cooking chamber whether and possibly to what extent it (Continued)

will take extra time to reach the target temperature. On this basis the appliance control unit calculates a cooking time extension, by which the cooking program step is extended.

9 Claims, 3 Drawing Sheets

(51) Int. Cl.
    *F24C 15/32*    (2006.01)
    *A21B 1/26*    (2006.01)
    *F24C 7/00*    (2006.01)
    *F24C 13/00*    (2006.01)
    *A21B 1/24*    (2006.01)

(52) U.S. Cl.
    CPC ............ *F24C 13/00* (2013.01); *F24C 15/325* (2013.01); *A21B 1/24* (2013.01); *H05B 1/0263* (2013.01)

(56) References Cited

FOREIGN PATENT DOCUMENTS

| | | | |
|---|---|---|---|
| DE | 2010002941 A1 * | 9/2010 | |
| EP | 2042809 | 1/2009 | |
| EP | 2211117 | 7/2010 | |
| EP | 2256415 A2 * | 12/2010 | ............... F24C 7/08 |
| EP | 2468101 | 6/2012 | |
| EP | 2469173 | 6/2012 | |

\* cited by examiner

METHOD FOR OPERATING A COOKING DEVICE, AND SUCH A COOKING DEVICE FOR PERFORMING THE METHOD

CROSS-REFERENCE TO RELATED APPLICATION

The present application is a U.S. national phase entry of pending International Patent Application No. PCT/EP2014/072051, international filing date Oct. 14, 2014, which claims priority to European Patent Application No. EP 13 188 602.0, filed Oct. 14, 2013, and also claims priority to European Patent Application No. EP 14 152 704.4, filed Jan. 27, 2014, the contents of which are incorporated by reference in their entireties.

FIELD OF THE INVENTION

The present invention pertains to a method for operating a cooking appliance in the form of a convection oven, a hot-air steamer, or a convection steamer, which is able to carry out an automatic cooking time adjustment.

BACKGROUND OF THE INVENTION

Modern cooking appliances in the form of convection ovens, especially convection steamers, which can control the corresponding cooking steps by means of cooking programs stored in the control unit, contain cooking steps with cooking times based on the load on an individual tray or rack. The quantities of food to be cooked which are loaded into cooking appliances, however, can differ considerably. Thus, when only half of the trays or racks are occupied by the food to be cooked, the cooking appliance is said to have only half a load, whereas, when all of the trays or racks are full, the cooking appliance is said to be fully loaded.

The heating power delivered by the cooking appliance must be allocated depending on the number of loaded trays. This allocation is relevant during the heating-up phase at the beginning of the cooking process. The material to be cooked, which is initially cold, lowers the temperature in the cooking chamber or cooking compartment, which may have been preheated to a nominal temperature. By means of the temperature controller, the heating device of the cooking chamber is used to bring the temperature back up to the nominal value. Because of the finite heating power of the heating device, this process is dependent on the size of the load. This means that, when the load is large, it takes longer to reach the nominal temperature than when the load is small. During the heating-up phase, it can be seen that, depending on the heating energy input, which is allocated in correspondence with the load, the larger the load, the longer the heating phase.

To compensate for the differences between loads, a core temperature sensor is often used, which has one or more probes to measure the temperature in the food itself. The cooking process is then not terminated after a fixed time but rather as a function of the core temperature which has been reached. Core temperature sensors, however, suffer from the disadvantages that, first, they must be present in the first place; second, they must be correctly inserted; and, third, in the case of many products such as frozen food, small items such as peas, etc., they can be used only with difficulty or not at all.

An object of the present invention is therefore to provide a method for operating a cooking appliance in the form of a convection oven, a hot-air steamer, or a convection steamer, by means of which the cooking time is adjusted automatically as a function of the load in the cooking chamber without the need for a core temperature sensor. This object is achieved by the features in claim 1.

SUMMARY OF THE INVENTION

The method according to the invention is characterized in that, on the basis of a cooking time, stored in memory, for a minimal load of specific type of food in the cooking chamber, this cooking time extending from a starting temperature value (T_Start) to a target temperature value (T_Nominal), it is determined from the detected temperature curve whether and possibly to what extent it will take extra time to reach the target temperature value; and in that, on the basis of the required amount of extra time thus determined, the cooking appliance control unit calculates a cooking time extension by which the current cooking program step is then extended. In other words, the extension of the cooking time is determined from the temperature curve in the cooking chamber.

The basic idea of the method is that the presence of the load results in a deficiency of energy at the beginning of the cooking process because of the need to heat up the appliance for the cooking process. This energy is therefore added on at the end of the cooking process; that is, the cooking process is extended to such an extent that this additional energy completes the cooking.

This deficiency of cooking energy is determined from the temperature curve, in that the difference between the target temperature or nominal cooking chamber temperature (T_Nominal) at which the cooking process takes place after the heat-up phase and the actual cooking chamber temperature present at the surface of the food product is integrated over the period between the time at which the door is closed and the time at which the nominal temperature is reached in the cooking chamber. Because the temperature difference is proportional to the heat flux into the product, the time integral over this temperature difference is proportional to the energy input. For the linear rise in the cooking chamber temperature, this integral is proportional to the initial triangular area of the cooking temperature curve.

Food or products to be cooked can be divided into various categories such as baked goods, meat, fish, vegetables, etc. If the various products differ in their cooking behavior, this can be taken into account in the calculation of the cooking time. This can be done in particular by the use of correction factors or scaling factors, which leads to a more accurate calculation and thus optimization of the cooking time for the product in question.

Accordingly, it is advantageous according to the present invention for the stored cooking programs to be assigned to product categories and for specific scaling parameters, which enter into the calculation of the cooking time extension, to be assigned to the product categories. Thus the cooking time can be adjusted more precisely to suit the product in question; it is easy to see how this can be done for various products such as baked goods, meat, fish, and vegetables.

The present invention thus also comprises an optimization of the cooking time adjustment as a function of the category of the product, the product itself, and/or the cooking program, which means that the calculation of the cooking times in question can lead to different results. In particular, not only the product category (meat, fish, vegetables) but also the cooking mode (warming, roasting, toasting, browning, etc.) can enter into the calculation of the cooking time extension, for the efficiency of the heat transfer depends on, among other things, the selected cooking mode. For example, when heating is carried out with steam, the heat transfer is more efficient as a result of the transfer of the heat of condensation to the food than it is with pure convection alone; similarly, the values obtained for cooking by the braising method differ from those obtained for cooking by the grilling method.

So that the cooking method in question can be controlled more accurately as a function of the size of the load in the cooking chamber, the initial thermal situation in the cooking chamber at the start of the cooking process is taken into account or specified for the calculation of the cooking time extension. The length of the cooking time will differ depending on whether or not the cooking chamber has already been heated at the beginning of the cooking process. In a preferred embodiment of the invention, the method proceeds from a preheated cooking chamber, wherein, in the case of a load of minimal size, it is assumed that the actual temperature in the cooking chamber will not change essentially after the minimal load has been introduced; i.e., no significant decrease in temperature will be observed. If cooling is observed, it can be assumed that the load is of larger size, and that a corresponding extension of the cooking time is required.

A cooking process can consist of several steps or phases. Each phase of the cooking program involving an increase in the nominal temperature relative to the temperature of the preceding phase presents a problem to be solved. That is, in the case of a multi-step cooking program, the extension must take place one step at a time. It must also be kept in mind, however, that, in contrast to the first cooking step, for which the cooking chamber has already been preheated, the cooking chamber itself, including its internal fittings, must now also be heated. This means that, even if only a load of minimal size is present, it still takes a certain amount of time until the new, higher temperature of the cooking step in question is reached. In such cases, however, it is not necessary to extend the cooking time, a fact which the cooking appliance control unit takes into account.

It is advantageous for the temperature curve in the cooking chamber to be monitored over a relatively long time after the introduction of the product and for the increase in temperature to be averaged. This guarantees that relatively small temperature variations will not lead to incorrect temperature gradients, which can cause an incorrect extrapolation of the required cooking time extension. The reversal of the circulating air blower in the cooking chamber, for example, can be a source of these influences or vatiations.

Thus it is also advantageous for the rising temperature gradient, i.e., the slope of the temperature curve, to be determined only after at least 50%, and preferably about 80%, of the target temperature has been reached or only after at least 50%, and preferably about 80%, of the set cooking time has elapsed, and for the cooking time extension to be calculated on that basis.

The present invention also comprises a cooking appliance in the form of a convection oven, a hot-air steamer, or a convection steamer, which is adapted to, and capable of, carrying out the method according to the invention. After determination of the cooking time extension t_b, the open-loop or closed-loop control unit present in the cooking appliance sets the end of the cooking time to this value.

BRIEF DESCRIPTION OF THE DRAWINGS

Additional details, features, and advantages of the present invention can be derived from the following description of exemplary embodiments, reference being made to the attached drawings.

DETAILED DESCRIPTION OF PREFERRED EMBODIMENTS

Figure 1:
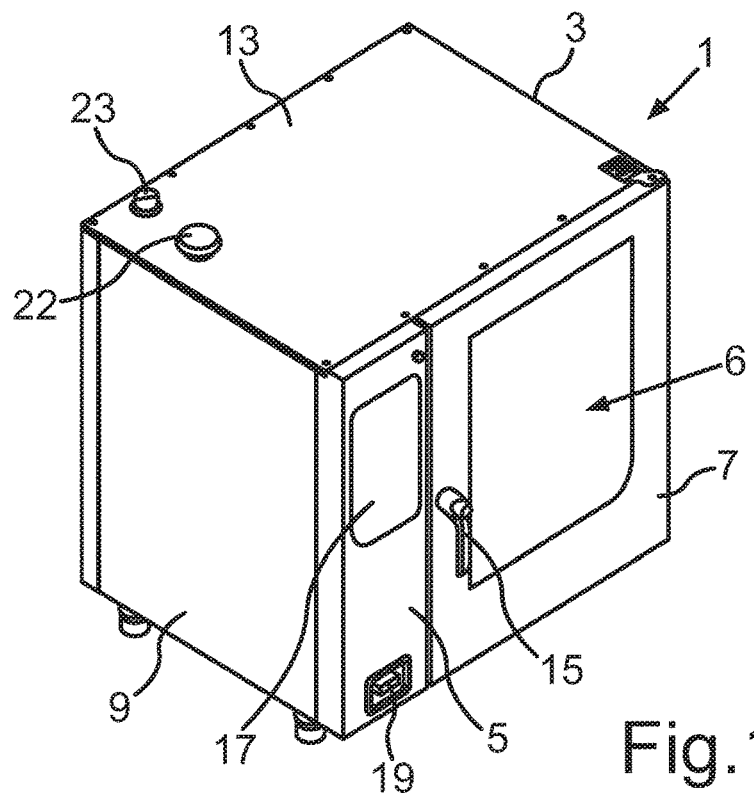
FIG. 1 shows a perspective view of a cooking appliance, which is adapted to carry out the method according to the present invention.
Figure 2:
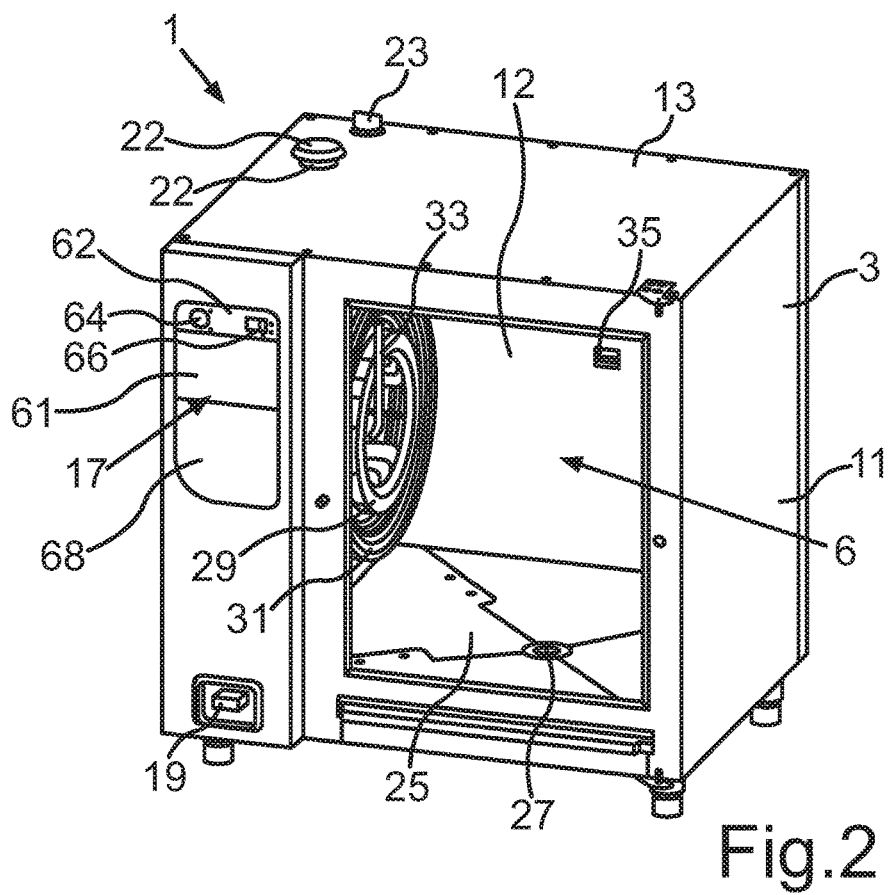
FIG. 2 shows another perspective view of the cooking appliance of FIG. 1 with the cooking chamber door removed.

FIGS. 1 and 2 show perspective views of a cooking appliance 1 in the form of a convection steamer, which is adapted to the implementation of the method according to the invention. Cooking appliance 1 comprises a housing 3, with a front cover wall, 5, a cooking chamber 6, which is closed by a cooking chamber door 7, and which is accessible after the door has been opened. Cooking appliance 1 also comprises a left side wall 9, a right side wall 11 (FIG. 2), and a top 13. A door handle 15 is provided to open and close cooking chamber door 7.

In the front cover wall 5 there is provided a display and control panel 17, which is configured in the form of a touchscreen. An input signal to the appliance control unit can be transmitted by direct contact with certain fields.

The subdivision of the display and control panel 17 is illustrated in more detail in FIG. 2. The display and control panel 17 comprises two different sub-display and operating panels. A rectangular touchscreen 61 is provided, which can be touched to enter a selection, wherein the appliance control unit will, in response, display the appropriate additional touchscreens to make the following inputs possible and to display the state of the cooking appliance associated with that state. As a result, the cooking appliance 1 can be easily controlled by the user.

Above touchscreen 61 a panel 62 with a single row is provided, on the left of which a loudspeaker 64 is provided, which is covered by a decorative foil and therefore cannot be seen on the appliance. On the right an on/off button 66 is provided for the cooking appliance 1, preferably also touch-sensitive. Under touchscreen 61 another decorative surface 68 is provided, which, if desired, can also be configured as an additional display and control panel.

For the sake of clarity, cooking chamber door 7 has been removed in FIG. 2, so that cooking chamber 6 can be seen more easily. Interior fittings such as air baffles and food support racks have also been removed. Cooking chamber 6 is bounded by a rear wall 12 at the back and also has a cooking chamber floor 25. In cooking chamber floor 25 a drain opening 27 is provided, through which any liquid and quenched steam can be conducted away. The liquid is conducted to a reservoir (not shown) underneath cooking chamber floor 25. On rear wall 12 a temperature sensor 35 is provided, which detects the temperature in cooking chamber 6.

As can be seen in FIG. 2, cooking appliance 1 comprises a blower wheel 29, which is surrounded by a heating device 31. The embodiment of the cooking appliance according to FIGS. 1 and 2 shows a "direct" steam injection system, in which water is supplied to the interior of blower wheel 29 through a pipe 33, is distributed by blower wheel 29, and is thrown onto heating device 31, where the water evaporates. The method can also be implemented, of course, in cooking appliances in which the steam is generated separately, i.e., outside cooking chamber 6, and introduced into cooking chamber 6 for the steaming treatment.

Figure 3:
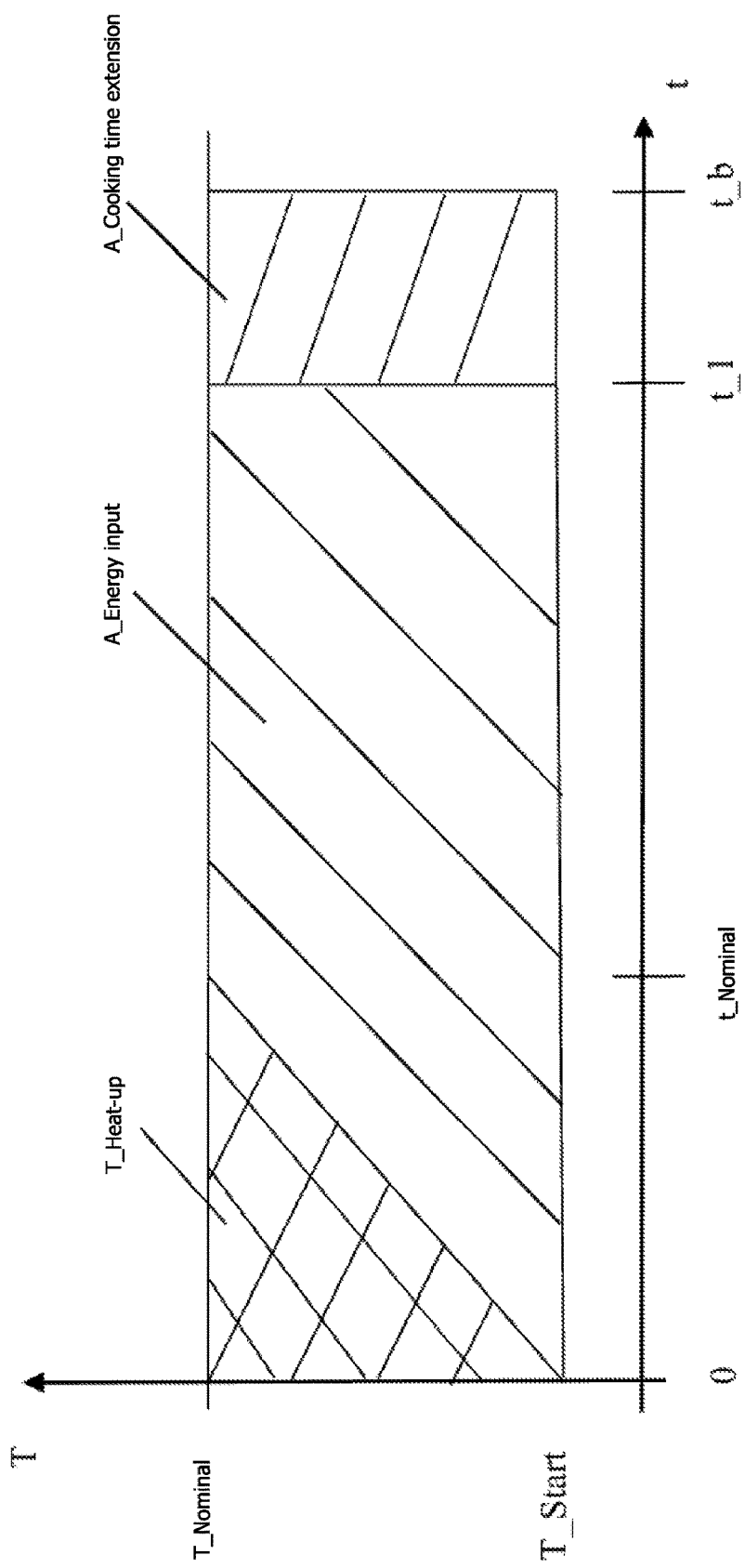
FIG. 3 shows a graph of an idealized cooking curve.

FIG. 3 shows a graph of an idealized cooking curve from a starting temperature value T_Start to a target temperature value T_Nominal over the time t. The horizontal axis shows the time t, and vertical axis the temperature T.

The graph of FIG. 3 shows an idealized cooking curve of a cooking step carried out with a load in the chamber. In this cooking step, the nominal temperature T_Nominal and the cooking time t_1 are specified in advance for the load on the tray. The extended cooking time t_b for the load which is present is determined from the cooking temperature curve.

In the ideal situation, heating begins at time 0 at a cooking chamber temperature T_Start and reaches the temperature T_Nominal after a time t_Nominal. The slope of the rising temperature curve depends largely on the degree to which the convection steamer is loaded. The triangular area A_heat-up with the corner points (0, t_Nominal), (0, T_Start), and (t_Nominal, T_Nominal) will thus differ in size depending on the size of the load. The area of A_heat-up is a measure of the energy which must be supplied initially to the cooking chamber so that all of the products are heated up externally to the nominal temperature T_Nominal. The area of A_heat-up is: 0.5×t_Nominal×(T_Nominal−T_Start).

The energy input into the food to be cooked for a single-tray load is defined by the area of the rectangle with the corner points (0, T_Nominal), (0, T_Start), (t_1, T_Start), and (t_1, T_Nominal). The area of A_energy input is: t_1×(T_Nominal−T_Start).

The approach of the method consists in supplying the extra amount of energy compared to that needed for the single-tray load after the single-tray nominal cooking time t_1 has been reached. Accordingly, the extended cooking time is found to be:

$$t\_b = t\_1 \times (A\_energy\ input + S \times A\_heat\text{-}up)/A\_energy\ input$$

Here S is an appliance-specific scaling factor. It is composed of two factors, namely, the cooking mode and the product category, according to the following table, for example:

| Cooking Mode | Product Category | S |
| --- | --- | --- |
| Convection air | Casseroles | 1.0 |
| Convection air | Roasting | 1.2 |
| Steaming | Frozen food | 1.1 |
| Steaming | Not frozen | 2.3 |
| Convection steaming | Casseroles | 2.7 |
| Convection steaming | Fish | 2.6 |
| . . . | . . . | . . . |

As can be seen from FIG. 3, the area value of the triangle A_heat-up is added to the rectangular area A_energy input to obtain the rectangular area A_cooking time extension, as a result of which the value for t_b is obtained for the cooking time extension. In the example shown here, the factor S equals 1.0.

That frozen food in "steaming" mode, usually carried out at 100° C., can be recognized is possible because, in this case, upon completion of the preheating step, the cooking chamber temperature drops below 55° C. when the food is introduced.

The detection of the slope of the cooking chamber temperature curve after introduction of the food to be cooked is now described with reference to FIG. 4. The values on the time axis (horizontal) are given in seconds, the temperature values (vertical) in ° C. Three curves can be seen: curve A, which represents the measured temperature values; curve B, which represents the averaged temperature values; and curve C, which represents the calculated slope of the temperature curve, i.e., the rising temperature gradient. By means of the calculated slope, it is possible to determine the time when the desired target temperature or nominal temperature value will be reached. On that basis, it is then possible to calculate the cooking time extension, as explained with reference to FIG. 3.

After the food to be cooked has been introduced into the cooking chamber, the chamber cools down as a function of the quantity and temperature of the food. By supplying heating power by means of the heating device, the temperature in the cooking chamber starts to rise again and continues to do so over time.

If the temperature in the cooking chamber is low, additional effects can occur, which can lead to another drop in temperature.

On consideration of the curves above, in particular the curve showing the real measured temperatures, it is evident that the measured temperature rises briefly to some extent prior to reaching the lowest point. In addition to effects which will not be identified here in detail, a change in the flow characteristics caused by a reversal in the direction of the blower or a change in the speed of the blower, for example, could lead to the temperature variations shown, as could also a change in a steam injection parameter.

When the slope of the temperature curve is determined, these effects must be taken into account and eliminated. For this purpose, the temperature curve must be monitored over a sufficiently long period of time. To smooth the temperature curve and thus to eliminate the smaller variations in the curve, the calculation is based on a sliding mean value of the temperature over the course of at least 30 seconds.

As soon as the temperature rises, a first reference point for the measurement of the slope is acquired. A 30-second mean value is derived. If a "minimum" is observed, a first reference point is set.

As soon as the slope becomes 0, a second reference point is recorded. If the slope then starts to increase again, however, and then returns to 0, the initially obtained second reference point is discarded and replaced by the new second reference point just acquired.

If, however, the slope then takes on a negative value again, both reference points are discarded, and the recording of the reference points begins again from the beginning.

The evaluation of the slope of the temperature curve is carried out as soon as both reference points have been determined and either the temperature has reached 80% of the target temperature or the nominal temperature or 80% of the set cooking time has elapsed. Thus it can be ensured that the slope can be determined reliably and the correct reference points are acquired.

Once these are established, the straight line is extended until it intersects both the time axis at 0 and the T_Nominal line, as a result of which the complete triangle A_heat-up is obtained, the area of which serves to determine the cooking time extension, as explained above.

If no slope can be determined because, for example, the conditions for terminating the process have already been fulfilled at starting time, or if a negative slope is present, then the nominal value should not be used. For example, this can be the case when the nominal temperature is present at the start of the calculation. This can occur when the cooking chamber has been preheated to a temperature higher than the nominal value and loaded with only a small amount of food or with food with lower heat capacity. The normal cooking time then remains in effect.

Additional factors should also be taken into account. Precisely in the case of low temperatures, steam treatment by means of direct water injection can have a negative effect on the measurement result, because the injection will usually cool the cooking chamber down additionally.

The present invention follows one basic principle: it works according to the model of setting up a cooking program for a very small load, such as one tray. Cooking programs of this type can be optimized as a function of the product and the cooking mode by the user himself, and additional cooking programs can be stored in the memory of the cooking appliance. After it has been loaded with a small amount of food, the cooking chamber temperature stays essentially the same. Advantageously, therefore, appropriate values for a minimal load for each cooking mode and each product to be cooked can be stored in the electronic cooking appliance control unit, possibly after an optimization of the starting values.

If the appliance control unit determines that the rising temperature gradient deviates from the one on file, it concludes that a larger load has been introduced and proceeds to calculate the cooking time extension accordingly.

Cooking appliances such as professional convection steamers can, at the start of the cooking time calculation, take into account not only the cooking mode but also various settings such as the category, the type of food, and the cooking program. For example, it is possible to cook either meat or baked goods in "convection" cooking mode. Depending on the category in question, the calculation of the cooking time extension for meat, for example, will result in a value different from that obtained for baked goods, and thus a different cooking time extension is added.

According to the invention, furthermore, the advantage is obtained that the control unit of the cooking appliance can store different calculation modes or scaling factors appropriate to various types of meat (roast pork, roast beef, veal shank, etc.), for example, and even to different preparation methods (cooking programs).

The user of the cooking appliance will preferably develop a cooking program which achieves the optimum cooking result for the minimum quantity of food to be cooked. The user can for this purpose select the cooking mode, the time, the humidity, and the blower speed (flow-generating device). The user will store the cooking program thus created in a product category and will advantageously choose a suitable name for it.

Ideally, cooking appliance 1 is preheated upon the start of the cooking program in question but before it is loaded. This preheating can be initiated automatically or manually. After the appliance control unit has informed the user by means of a display on the display and control device or panel 17 and/or by transmitting a signal, possibly an acoustic signal, that the target temperature or preheating temperature has been reached, the user then loads cooking chamber 6 with a quantity of food which is unknown to the control unit and which is intended for the selected cooking program. The appliance control unit stores the course of the cooking chamber temperature in its memory.

Figure 4:
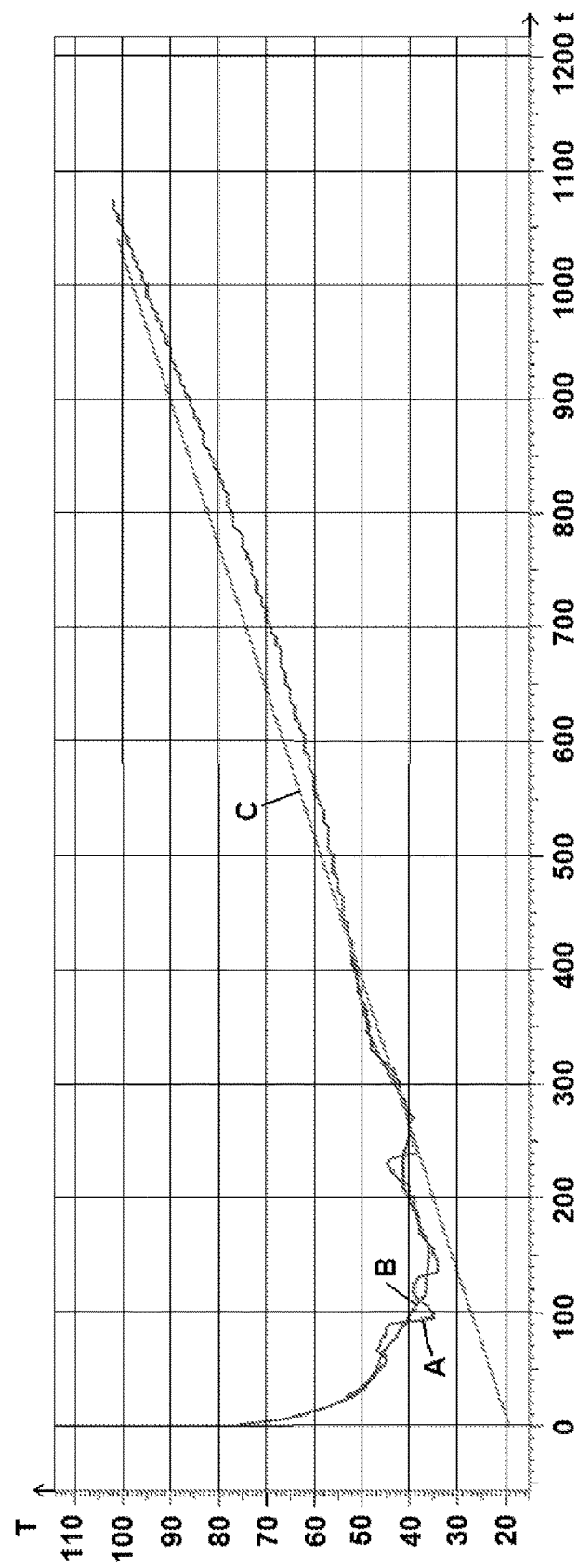
FIG. 4 shows an example of an actual cooking curve detected by sensors.

The introduction of the food, which can be anywhere from cold to frozen, causes the atmosphere in cooking chamber 6 to cool down initially, even though the heater is working, as shown by curves A and B in FIG. 4. The extent of the cooling depends on the quantity of food; on the duration of the loading process, during which the heating function is paused; and on the temperature of the food. After a certain time, the temperature starts to rise again (first inflection). The time required to reach the nominal temperature is stored, wherein it depends on the quantity of food loaded into the appliance.

If the quantity is very small, the nominal temperature is reached quickly or even immediately after the start of the cooking program. In the case of larger quantities, the additional time required and thus the cooking time extension can be up to 50% of the total cooking time, which is a large value. If the cooking time is not extended or is not sufficient, which the user can estimate only with difficulty or not at all, the desired cooking result will not be obtained.

For an exact detection of the cooking chamber temperature during the heating-up phase, the location of temperature sensor 35 inside cooking chamber 6 is of crucial importance. That is, it makes a considerable difference whether the temperature sensor is placed near the heating device or near the food. According to the invention, temperature sensor 35 is placed near the food or, alternatively, in the intake area of blower wheel 29 of the flow-generating device.

With the present invention, it is possible, for example, on the basis of empirically acquired data and the stored calculation formulas or algorithms, to calculate the cooking time required to cook a full load of raw beef to "medium". This calculation can differ significantly from the cooking time of a full load of baked goods because of the empirical values entering into the calculation, even though the cooking program in question possibly calls for a comparable or similar temperature/humidity for cooking or the appliance control unit or the operator selects a comparable temperature/humidity for cooking.

With the present invention, therefore, a significantly improved cooking result on operation of a convection steamer in comparison to the prior art is achieved without the use of a core temperature sensor.

The invention claimed is:

1. A method for operating a cooking appliance in the form of a convection oven, a hot-air steamer, or a convection steamer comprising the steps of:
providing a cooking chamber which can be closed by a cooking chamber door, a heating device, at least one steam injection device, at least one flow-generating blower device at least one temperature sensor, which detects the temperature in the cooking chamber, and an electronic appliance control unit with memory, in which cooking programs comprising the cooking sequences for specific food products are stored;
determining whether, and how much, extra time will be required to reach a target temperature value from a starting temperature value, based on a detected temperature curve for a selected food type in the cooking chamber, and on a stored cooking time for a minimal load size of the selected food type beginning from a cooking time for a certain type of food product stored in memory for a load of minimal size present in the cooking chamber, the time extending from a starting temperature value to a target temperature value, it is determined on the basis of the detected temperature curve in the cooking chamber whether and possibly to what extent it will take extra time to reach the target temperature; and
calculating determined extra cooking time by the electronic appliance control unit by which the cooking program step currently running is then extended.

2. The method of claim 1 wherein the stored cooking programs are assigned to food-type product categories, and in that specific scaling parameters, which enter into the calculation of the cooking time extension, are assigned to the product categories.

3. The method of claim 1 wherein appliance-specific factors, namely the cooking mode, assigned to the cooking programs enter into the calculation of the cooking time extension.

4. The method of claim 1 wherein at the start of the cooking process, an original thermal situation in the cooking chamber is taken into account or specified for the calculation of the cooking time extension.

5. The method of claim 1 wherein in the case of a subsequent cooking step, a thermal inertia of the cooking chamber is taken into consideration in the calculation of the cooking time extension of the subsequent step.

6. The method of claim 1 wherein the change in temperature in the cooking chamber after introduction of the food products is monitored over a relatively long time, and the temperature increase is averaged.

7. The method of claim 1 wherein the slope of the temperature curve is determined after at least 50%, and preferably about 80%, of the target temperature value has been reached or after at least 50%, and preferably about 80%, of the set cooking time has elapsed, and the expected cooking time extension is calculated on that basis.

8. A cooking appliance comprising: a convection oven, a hot-air steamer, or a convection steamer, which includes a cooking compartment or chamber which can be closed by a cooking chamber door, a heating device, at least one steam injection device, at least one flow-generating blower device at least one temperature sensor, which detects the temperature in the cooking chamber, and an electronic appliance control unit with memory, in which cooking programs comprising cooking sequences for specific food products are stored; wherein the cooking appliance being adapted to, and capable of starting from a basic heat-up value stored in memory for a specific type of food for a load of minimal size in the cooking chamber, determining whether, and how much, extra time will be required to reach a target temperature value from a starting temperature value, based on a detected temperature curve for a selected food type in the cooking chamber, and on a stored cooking time for a minimal load size of the selected food type wherein the cooking appliance control unit determines extra cooking time and calculates additional cooking time by which the current cooking program step currently running is then extended, the electronic appliance control unit sets the end of the cooking time to this value.

9. The cooking appliance of claim 8 wherein the temperature sensor is arranged remotely from the heating device and in proximity to the food product or alternatively in the intake area of the flow-generating device.

* * * * *